(12) United States Patent  
Ponceleon

(10) Patent No.: US 9,363,075 B2  
(45) Date of Patent: Jun. 7, 2016

(54) POLYMORPHIC ENCRYPTION KEY MATRICES

(71) Applicant: International Business Machines Corporation, Armonk, NY (US)

(72) Inventor: Dulce B. Ponceleon, Palo Alto, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 329 days.

(21) Appl. No.: 14/057,203

(22) Filed: Oct. 18, 2013

(65) Prior Publication Data

US 2015/0110273 A1    Apr. 23, 2015

(51) Int. Cl.
- *H04L 9/00* (2006.01)
- *H04L 9/08* (2006.01)
- *H04L 9/14* (2006.01)

(52) U.S. Cl.
CPC ............ *H04L 9/0816* (2013.01); *H04L 9/0822* (2013.01); *H04L 9/14* (2013.01); *H04L 2209/601* (2013.01)

(58) Field of Classification Search
CPC .................................................. H04L 9/3297
USPC .......................................................... 380/277
See application file for complete search history.

(56) References Cited

U.S. PATENT DOCUMENTS

| 6,118,873 | A | 9/2000 | Lotspiech et al. | |
| 6,947,563 | B2 | 9/2005 | Fagin | |
| 2006/0083371 | A1* | 4/2006 | Duval | H04N 7/163 380/28 |
| 2007/0192599 | A1* | 8/2007 | Kato | H04L 9/0844 713/168 |
| 2008/0307217 | A1* | 12/2008 | Yukimatsu | G06F 21/10 713/150 |
| 2009/0296928 | A1* | 12/2009 | Matsumoto | H04L 9/0662 380/46 |
| 2010/0020966 | A1* | 1/2010 | Hata | H04L 9/088 380/44 |
| 2012/0243687 | A1* | 9/2012 | Li | H04L 9/085 380/277 |

FOREIGN PATENT DOCUMENTS

JP          201074537 A     4/2010

OTHER PUBLICATIONS

Dijiang Huang; Location-aware Key Management Scheme for Wireless Sensor Networks; Year: 2004; ACM; p. 29-42.*

(Continued)

*Primary Examiner* — Monjour Rahim  
(74) *Attorney, Agent, or Firm* — Erik Huestis; Stephen Kenny; Foley Hoag LLP

(57) ABSTRACT

Space-efficient key allocations in broadcast encryption systems are provided. In some embodiments, a key bundle is read. The key bundle includes a first cryptographic key, an associated first key identifier, and an associated first cryptographic function identifier. Encrypted content is received. A plurality of encrypted keys is received. Each encrypted key has an associated identifier. A first encrypted key is selected from the plurality of encrypted keys such that the key identifier of the first encrypted is equivalent to the first key identifier. A first cryptographic function is determined corresponding to the first cryptographic function identifier. The first cryptographic function is applied to the first encrypted key using the first cryptographic key to obtain a first intermediate cryptographic key. A content cryptographic key is determined using the first intermediate cryptographic key. The content cryptographic key is applied to the encrypted content to obtain decrypted content.

20 Claims, 5 Drawing Sheets

(56) References Cited

OTHER PUBLICATIONS

Rui Zhang, et al., On the Security of Multiple Encryption or CCA-security+CCA-security=CCA-security?,Cryptology ePrint Archive, Report 2003/181, Sep. 20, 2003, [retrieved on Sep. 25, 2014], <URL: http://eprint.iacr.org/2003/181>.

* cited by examiner

200

| Column | Row | Key | Function |
|---|---|---|---|
| 0 | 456 | 0x0f6213fc253e53c1e7af71ad3cf0fc65 | AES-128 |
| 1 | 722 | 0x22afbe702aaf6122483aca8e8b6d0581 | Blowfish |
| 2 | 3 | 0x460b3afbcc14d40cb5b8e69ef7ab927c | Blowfish |
| 3 | 987 | 0x31cb2506bdbc19fcb30135392aac26ae | Blowfish |
| 4 | 6 | 0x5170421a1362dac1da77db7d06f2d439 | AES-128 |
| 5 | 42 | 0x9edbf64adcafceab0477f0e172f9744c | Blowfish |
| 6 | 4 | 0xd324c83e84810ec5fd0c7cd08eb43bcf | AES-128 |

FIG. 2

| Column=6 | Column=<br>0x1c3c03721411d95297b8eb02f98deabf |
|---|---|
| 0x3878320e1e1cbb1f22c6a3c8a3fb1a63 | 0xdbc98abf14a66b99b21ca7e0ad86a48c |
| 0x2b5d2fb874a42c7fffa6fcaef7f87e2c | 0xf41c62051fe450d3a7c77c387552b4e0 |
| 0xef1418d0b0875d97c754eb785e20b1bf | 0x3468758be216c54522b1fd2a1e7b32e2 |
| 0x29372fe8b18619be35832e2a88248357 | 0x5a4a985aa42a0e0774bf08d486abc2d9 |
| 0x6df0f615d08d392e18a859e57d0bcfa8 | 0x5d18c43ccac56f69eeb46482c8314123 |
| 0xaaaaff8617af2d3d23277b64c096f78f | 0xcfa998545660679b04052c407a06a2c2 |
| 0xebe70bb124977b3fb2a326921a19652b | 0x437414dee3c113ee28fb25d6d0807352 |

FIG. 3

POLYMORPHIC ENCRYPTION KEY MATRICES

BACKGROUND

Embodiments of the present invention relate to broadcast encryption, and more specifically, to space-efficient key allocations in broadcast encryption systems.

SUMMARY

According to one embodiment of the present invention, a method of and computer program product for broadcast encryption is provided. In this embodiment, a key bundle is read. The key bundle includes a first cryptographic key, an associated first key identifier, and an associated first cryptographic function identifier. Encrypted content is received. A plurality of encrypted keys is received. Each encrypted key has an associated identifier. A first encrypted key is selected from the plurality of encrypted keys such that the identifier of the first encrypted key is equivalent to the first key identifier. A first cryptographic function is determined corresponding to the first cryptographic function identifier. The first cryptographic function is applied to the first encrypted key using the first cryptographic key to obtain a first intermediate cryptographic key. A content cryptographic key is determined using the first intermediate cryptographic key. The content cryptographic key is applied to the encrypted content to obtain decrypted content.

According to another embodiment of the present invention, a method of and computer program product for broadcast encryption is provided. In this embodiment, a key bundle is provided. The key bundle comprises a first cryptographic key, an associated first key identifier, and an associated first cryptographic function identifier. Encrypted content is provided. A plurality of encrypted keys is provided. Each encypted key has an associated key identifier. The plurality of encrypted keys are selected such that the encrypted content is decryptable by selecting a first encrypted key from the plurality of encrypted keys such that the identifier of the first encrypted key is equivalent to the first key identifier; determining a first cryptographic function corresponding to the first cryptographic function identifier; applying the first cryptographic function to the first encrypted key using the first cryptographic key to obtain a first intermediate cryptographic key; determining a content cryptographic key using the first intermediate cryptographic key; and applying the content cryptographic key to the encrypted content.

BRIEF DESCRIPTION OF THE SEVERAL VIEWS OF THE DRAWINGS

FIG. 2 is an exemplary device key bundle according to an embodiment of the present disclosure.

FIG. 3 is an exemplary media key block according to an embodiment of the present disclosure.

DETAILED DESCRIPTION

Figure 1:
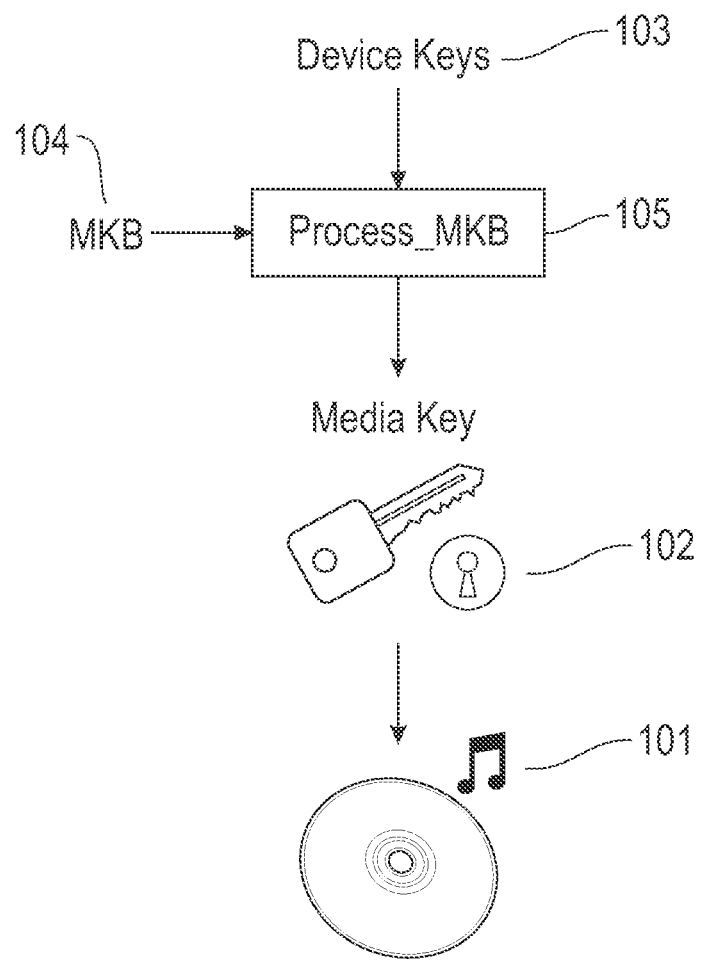
FIG. 1 is a schematic representation of a broadcast encryption scheme according to an embodiment of the present disclosure.

Key matrices may be used for space-efficient key allocations in broadcast encryption systems. In a key matrix approach, an authorized content consumer (e.g., a digital media player) applies a one-way encryption function in order to traverse from column-to-column of a key matrix. At each step of the traversal, an encryption key is derived, and the process is repeated until a target key is obtained. Authorized clients are allocated a unique small set of device keys that are related to specific rows in specific columns of the key matrix. When the authorized client applies an encryption function using one of its device keys, a new key is generated. This new key is applicable to a cell in a subsequent column. Repetition of this process ultimately yields a final decryption key that may be used to decrypt protected content. The key matrix approach allows a combination of keys to be revoked by modification of data included with subsequently distributed protected content (Media Key Blocks, discussed below).

A single predetermined one-way function may be applied to generate subsequent keys in a matrix. Where this function is known in advance, an attacker may be able derive additional keys through brute force. In particular, the result of a known one-way function may be computed for all possible inputs. Once a result matches any known encryption key, the attacker has derived a key that he was not authorized to have, by effectively traversing backwards through the key matrix. The results of such a brute force computation may be compared to an entire column of keys in parallel. If the attacker has multiple sets of broken final encryption keys, then this parallelism is increased further.

Once any one column has been cracked, the attacker may continue to crack the column that points to it, and so on back through all of the columns in the encryption key bundle. The attacker will then have sets of keys that the attacker did not originally have, allowing unauthorized decryption of content, or impersonation of other decryption devices.

To minimize the risk of such an attack, the one-way function may be chosen so that a brute force attack is infeasible. In particular, a function may be chosen that will require a prohibitive amount of time to crack through brute force. For example, a one-way function that uses AES-128 is generally believed to be impossible to crack at this time. However, attackers have access to increasingly large clouds (or botnets) comprising multiple computers whose average individual computation power is doubling every 18 months. With the ongoing increase in computing power, attackers can crack by brute force approximately one more bit of encryption strength each year. In addition, there are occasional technological (hardware or algorithmic) developments which allow orders-of-magnitude leaps in cracking efficiency (e.g., rainbow tables, CPU support for AES, multi-core parallelism, massive parallelism in GPUs, FPGAs, quantum computing). Given these ongoing advances, a one-way function that cannot be practically cracked at present may be cracked in the near future.

To address the risk of a brute force attack in broadcast encryption, the present disclosure provides for variation of the encryption function applicable to individual keys in the matrix. When the encryption function varies within a system, an effective brute force attack cannot be launched. Even where it is possible to brute force a single known function, it is not possible to perform a brute force attack where the applicable encryption function is unknown. In addition, by allowing the encryption function to vary, key lengths may be decreased while maintaining the same effective encryption strength.

Referring to FIG. 1, a schematic representation of a broadcast encryption scheme is provided. In general, encrypted content 101 is encrypted with media key 102. Media Key ($K_m$) 102 is determined by an authorized content consumer by processing a Media Key Block (MKB) 104 using a set of Device Keys ($K_d$) 103. Media Key 102 is specific to the encrypted content, Device Keys 103 are included in an authorized content consumer (such as a digital media player), and Media Key Block 104 is included with the encrypted content, for instance in the lead-in area of optical media such as a DVD.

In such a broadcast encryption scheme, a Key Generation Facility (KGF) is responsible for generating a plurality of encryption keys, including Media Keys 102 and Device Keys 103. The Key Generation Facility is also responsible for generating a Media Key Block 104 from which a given Media Key 102 may be derived by an authorized content consumer.

Encrypted content is encrypted using a unique Media Key 102 prior to distribution, whether via a network or on optical media such as a DVD. In conjunction with the encrypted content, the appropriate Media Key Block 102 is provided. In some embodiments, the Media Key Block 104 is located on optical media with the encrypted content 101. In other embodiments, the Media Key Block 104 is distributed over a network before, after, or during distribution of the encrypted content. In some embodiments, the encrypted content and the Media Key Block 104 are distributed via different mechanisms, while in some embodiments they are distributed through the same mechanism.

An authorized consumer of the encrypted content, such as a media player, is provided with a bundle of Device Keys ($K_d$) 103. By processing 105 the Media Key Block (MKB) 104 with its Device Keys 103, the authorized player is able to determine the Media Key ($K_m$) 102. The Media Key ($K_m$) 102 is then used to decrypt the encrypted content 101. One of skill in the art would recognize that several methods are known for processing a Media Key Block 104 to obtain a Media Key 102, such as those practiced in CPRM/CPPM.

The Key Generation Facility furnishes different authorized content consumers, or groups of consumers, different bundles of Device Keys. The Media Key Block is generated by the Key Generation Facility so that only authorized Device Keys are able to determine a given Media Key from the Media Key Block. If a given consumer or media player is no longer authorized to consume the encrypted content, then subsequent Media Key Blocks generated by the Key Generation Facility will not enable such revoked players to obtain the Media Key. In this way, a revoked consumer will be unable to decrypt content provided after its revocation.

FIG. 2 depicts an exemplary Device Key Bundle according to an embodiment of the present disclosure. Device Key Bundle 200 includes multiple entries (depicted as rows), each comprising a column identifier 201, a row identifier 202, and a key 203. In some embodiments, the keys 203 are 128 bit (16 byte) AES keys, function identifier 204 is omitted, and the applicable function is known to an authorized content consumer a priori. In some embodiments, an alternative block cipher is used. Various ciphers and corresponding key lengths may be used, including but not limited to AES, Blowfish, C2 block cipher, Camellia, CAST-128, CAST-256, CLEFIA, Cryptomeria, DES, FEAL, GOST 28147-89, ICE, IDEA, KASUMI, LOKI97, Lucifer, MacGuffin, MAGENTA, MARS, MISTY1, RC2, RC5, RC6, Skipjack, SMS4, TEA, Triple DES, Twofish, and XTEA.

In some embodiments, each entry includes a function identifier 204. Function identifier 204 indicates which cryptographic function is applicable to key 203. In some embodiments, function identifier 204 is a salt to a known cryptographic function, (i.e., a random value that provides an additional input to the cryptographic function). In some embodiments, function identifier 204 includes both an indication of the function to be applied and a salt value. In some embodiments, function identifier 204 includes information sufficient to derive a function or a salt value. For example, function identifier 204 may include a seed to a pseudorandom number generator that is then used to generate a salt value or other parameter to a cryptographic function. In some embodiments, function identifier 204 includes a description of the cryptographic function to be applied, encoded in a language suitable for encoding of mathematical functions, such as MathML.

In some implementations, Device Key Bundle 200 contains exactly one key for each possible column identifier (e.g., from 0 to 16383). One of ordinary skill in the art would appreciate that there are a variety of physical representations available to store the logical data contained in Device Key Bundle 200. For example, the column and row identifiers may be combined in a single explicit identifier. The column and row may be indicated by the layout of a data structure containing the entries, such as a multi-dimensional array. In some embodiments, the key is associated with x, y, and z values instead of column and row values in order to identify a position in a three dimensional matrix. In some embodiments, the key is associated with an n-vector that identifies a point in n-dimensional space.

FIG. 3 depicts an exemplary Media Key Block according to an embodiment of the present disclosure. Media Key Block 300 includes a plurality of columns 301, 302. First column 301 includes a header 310 and a plurality of encrypted values 311 . . . 317. Header 310 includes a column identifier (e.g., Column=6). In alternative embodiments, instead of column header 310, each encrypted value 311 . . . 317 may be paired with a cell identifier, which may comprise a column and row number. One of ordinary skill in the art would appreciate that there are various physical representations available to store the logical data contained in Media Key Block 300. For example, each key may be associated with an explicit row identifier or the row identifier may arise as a result of the location of the key within a data structure such as an array.

Second column 302 includes a header 320 and a plurality of encrypted values 321 . . . 327. Header 320 includes an encrypted column identifier. In some embodiments, additional columns are included in Media Key Block 300. In addition, some embodiments may have additional information included in the column headers 310, 320 or in the Media Key Block 300. For example, column headers 310, 320 may include a verification value that may be used to confirm whether a target key has been obtained.

Figure 4:
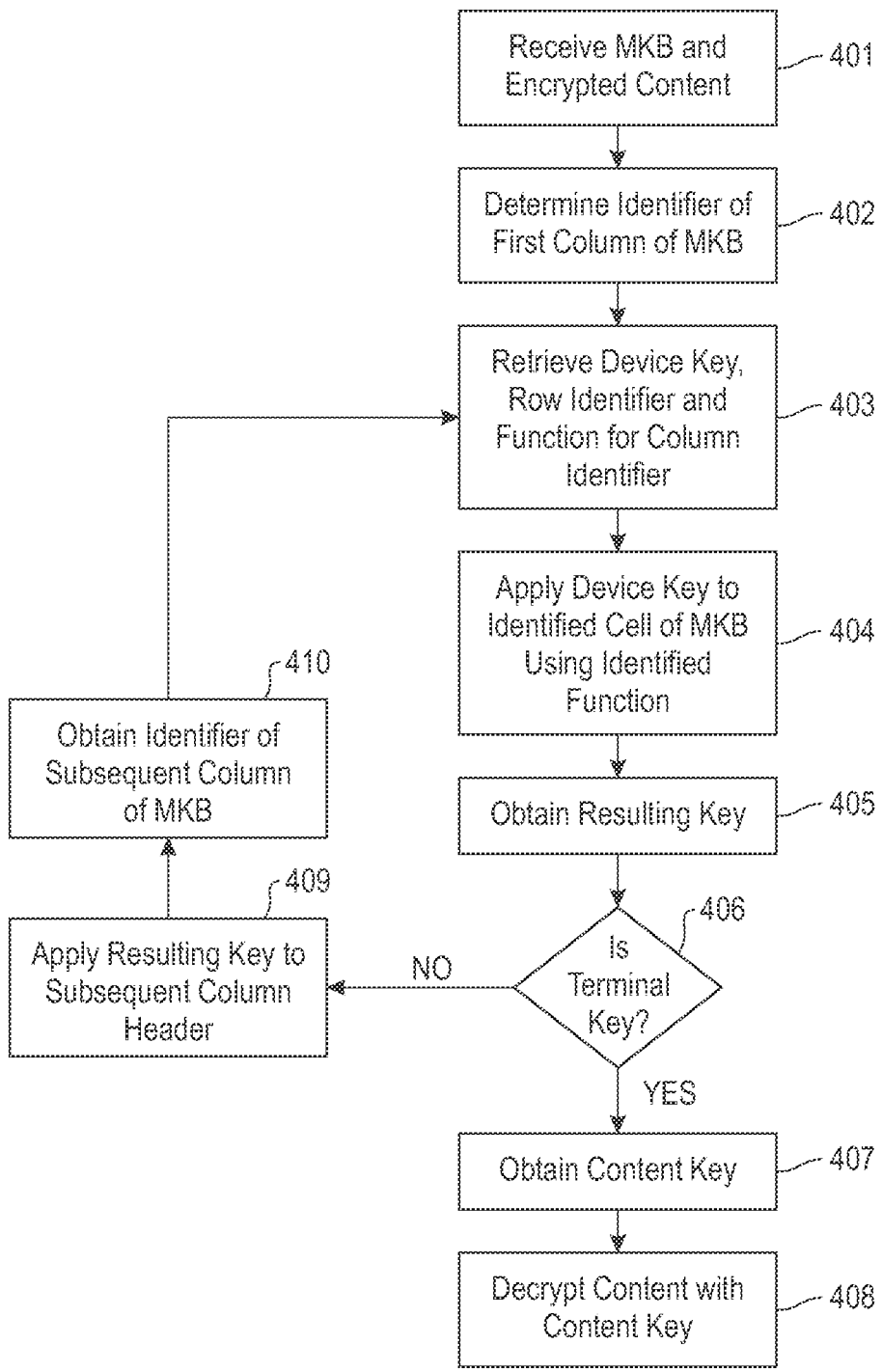
FIG. 4 is a method of decrypting content according to an embodiment of the present disclosure.

FIG. 4 illustrates a method of decrypting encrypted content according to an embodiment of the disclosure. At 401, a content consumer receives encrypted content and a Media Key Block (e.g., 300). In some embodiments, the Media Key Block and encrypted content are received together, for example on a machine readable medium such as a DVD. In other embodiments, the encrypted content and Media Key Block are received separately. At 402, the content consumer examines the Media Key Block to determine a column identifier of the first column (e.g., 310) contained in the MKB. At 403, the content consumer selects a device key (e.g., 243), a row identifier (e.g., row 4, 242), and a function identifier (e.g., AES-128, 244) from the device key bundle having the same column identifier (e.g., column 6). In some embodiments, the device key bundle is resident in an authorized content consumer, such as a DVD media player. In other embodiments, the device key bundle is conveyed to the content consumer via a network or via a machine readable medium.

At 404, the content consumer applies the device key (e.g., 243) to the cell of the MKB corresponding to the previously determined row identifier (e.g., column 6, row 4, 314). At 405, the content consumer obtains a resulting key. At 406, the resulting key is tested to determine whether it is a terminal key. In some embodiments, the terminal key is identified by applying it to a verification field contained in the MKB to obtain a predetermined value (e.g., 0xDEADBEEF). If a terminal key has been found, it is used to obtain a content key 407. In some embodiments, the terminal key is the content key. In other embodiments, the terminal key is used to decrypt a content key. In yet other embodiments, a series of functions is applied to the terminal key to obtain the content key.

If the resulting key is not terminal, then the media consumer applies it to the header (e.g., 320) of a subsequent column of the MKB at 409. At 410, the content consumer obtains a decrypted column identifier from the application of the key to the column header. Using this new column identifier, steps 403-406 are repeated to obtain the next key in a series until a terminal key is obtained. In some embodiments of step 404, both a device key of the content consumer and the prior resulting key are applied to the identified cell of the MKB. For example, once a device key is determined for the relevant column at 403, the resulting key is applied to the corresponding column and row of the MKB to determine an intermediate value. The device key is then applied to determine the next key. In some embodiments, the device key may be applied prior to the resulting key. In some embodiments, a series of additional functions is applied to obtain the next key from the device key and the prior resulting key. In some embodiments, the cryptographic function used in conjunction with the prior resulting key is determined by a function identifier included in header 320.

As discussed above, the Polymorphic Key Matrix approach enables many encryption functions to be used in the same broadcast encryption scheme. An authorized consumer of content is provided with a set of Device Keys coupled with a description of encryption functions, and a mapping between functions and keys. The description may be a function identifier, a salt value, or any other information sufficient for the content consumer to apply the requisite function. Consumers are not given descriptions of functions that are not required (i.e., not for their row/column combinations) for their traversals. Because the function varies, an attacker does not know which one-way function must be cracked to derive an unknown key. If an attacker obtains a matching answer for some function, he does not know if that was the correct function, and so cannot effectively deploy a brute force attack. Even an accurate guess as to the correct function for a given key will not provide an attacker with information regarding the function necessary to traverse into additional columns. Thus, application of the Polymorphic Key Matrices of the present disclosure effectively precludes brute force attacks directed to obtaining unknown keys. In some embodiments the content provider does know all of the functions applied in extant media key blocks in order to generate future keys. However, in some embodiments, additional functions may be added to the existing system by modifying the content provider without rendering existing content inaccessible. In some embodiments, different content providers are allocated different functions. In some embodiments, the functions in use are known to a forensics system, which may be used to detect compromised keys.

Furthermore, because some of the effective encryption strength of the broadcast encryption system can be relocated to polymorphic traversal functions, the strength of a key of a given length is greatly increased. In some applications, the protection of unknown keys is more important than protection of individual content (or a single message). Broadcast encryption techniques may be applied in such circumstances. Therefore, the size of the starting keys may be reduced, which may result in a reduced MKB size in systems utilizing a MKB. For example, the strength of the encryption applied may be selected to protect individual content for its useful lifetime (even if that is only a few hours or days). The result is that the aggregated decryption key bundle size may be significantly reduced. In some implementations, the decryption key bundle size may be reduced by half or more. Since the decryption key bundle is coupled with the broadcast transmissions (as opposed to being included in one-time static key and function storage in the clients) it significantly reduces the ongoing transmission overhead.

In some embodiments, the traversal function for each cell in the matrix is different. This is equivalent to giving out larger keys with regard to the space required by the content consumer. Although the space requirements of the content consumer are high, the decryption key bundle provided with the encrypted content is small. Thus, efficient use is made of available bandwidth while maintaining adequate protection of encrypted content.

In some embodiments, traversal functions are used for multiple cells in the matrix. In such a Partial Polymorphic Matrix approach, various allocations of functions to cells may be used. For example, a different function may be used for each column or each row. As another example, some columns may have one function, while other columns have one function per row. Any allocation of function to cell may be adopted in accordance with this disclosure.

As discussed above, the subject matter of the present disclosure is suitable for use in a broadcast encryption scheme. The present disclosure is applicable to existing broadcast encryption schemes such as CPRM/CPPM. An existing broadcast encryption scheme may be modified by adding a function identifier in accordance with the present disclosure to a key bundle provided to a content consumer.

Figure 5:
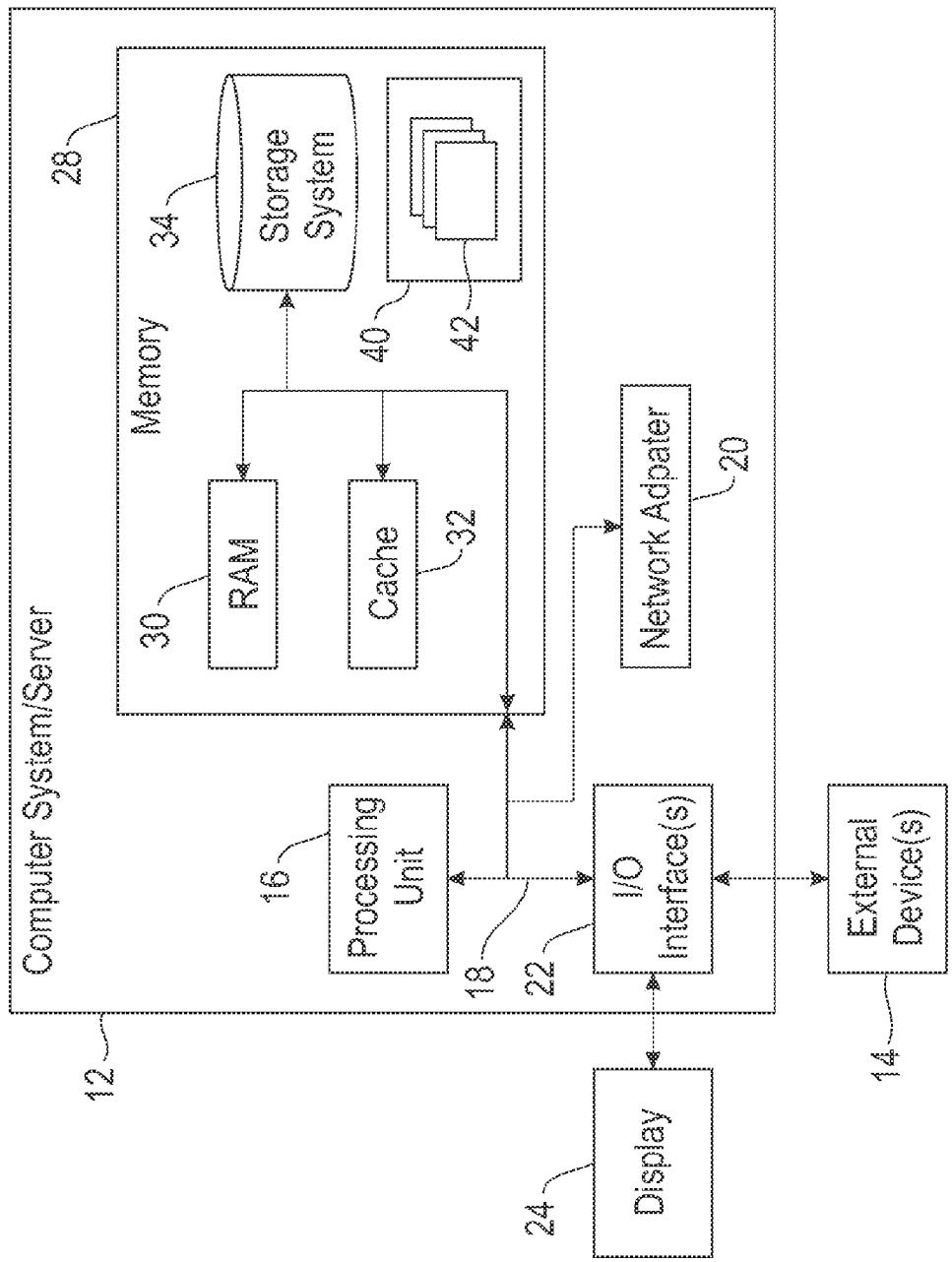
FIG. 5 depicts a computing node according to an embodiment of the present invention.

Referring now to FIG. 5, a schematic of an example of a computing node according to an embodiment of the present invention is provided. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   reading, by a hardware processor, a key bundle, the key bundle comprising a first cryptographic key, an associated first key identifier, and an associated first cryptographic function identifier, the first cryptographic function identifier identifying a first cryptographic function and providing information sufficient to derive the first cryptographic function;
   receiving, by the hardware processor, encrypted content;
   receiving, by the hardware processor, a plurality of encrypted keys, each encrypted key having an identifier;
   selecting, by the hardware processor, a first encrypted key from the plurality of encrypted keys such that the identifier of the first encrypted key is equivalent to the first key identifier;
   determining, by the hardware processor, the first cryptographic function corresponding to the first cryptographic function identifier using at least the first cryptographic function identifier;
   applying, by the hardware processor, the first cryptographic function to the first encrypted key using the first cryptographic key to obtain a first intermediate cryptographic key;
   determining, by the hardware processor, a content cryptographic key using the first intermediate cryptographic key; and
   applying, by the hardware processor, the content cryptographic key to the encrypted content to obtain decrypted content.

2. The method of claim 1, wherein the decrypted content comprises multimedia data.

3. The method of claim 1, wherein the first cryptographic function identifier is a salt value.

4. The method of claim 1, wherein the first cryptographic function identifier is a random seed.

5. The method of claim 1, wherein the first cryptographic function is selected from the group consisting of: a block cipher, AES, Blowfish, C2 block cipher, Camellia, CAST-128, CAST-256, CLEFIA, Cryptomeria, DES, FEAL, GOST 28147-89, ICE, IDEA, KASUMI, LOKI97, Lucifer, MacGuffin, MAGENTA, MARS, MISTY1, RC2, RC5, RC6, Skipjack, SMS4, TEA, Triple DES, Twofish, and XTEA.

6. The method of claim 1, wherein the first key identifier and the identifiers of the plurality of encrypted keys are column and row pairs.

7. The method of claim 1, wherein the first key identifier and the identifiers of the plurality of encrypted keys are n-vectors.

8. The method of claim 1, wherein the key bundle comprises a second cryptographic key, an associated second key identifier, and an associated second cryptographic function identifier and wherein determining a content cryptographic key using the first intermediate cryptographic key comprises:
   selecting a second encrypted key from the plurality of encrypted keys such that the identifier of the second encrypted key is equivalent to the second key identifier;
   determining a second cryptographic function corresponding to the second cryptographic function identifier;
   applying the second cryptographic function to the second encrypted key using the second cryptographic key to obtain a second intermediate cryptographic key; and
   determining the content cryptographic key using the second intermediate cryptographic key.

9. The method of claim 1, wherein determining a content cryptographic key using the first intermediate cryptographic key comprises:

applying a third cryptographic function to the first intermediate cryptographic key.

10. A method comprising:
providing a key bundle, the key bundle comprising a first cryptographic key, an associated first key identifier, and an associated first cryptographic function identifier, the first cryptographic function identifier identifying a first cryptographic function and providing information sufficient to derive the first cryptographic function;
providing encrypted content;
providing a plurality of encrypted keys, each encrypted key having an key identifier, the plurality of encrypted keys selected such that the encrypted content is decryptable by:
selecting, by a hardware processor, a first encrypted key from the plurality of encrypted keys such that the identifier of the first encrypted key is equivalent to the first key identifier;
determining, by the hardware processor, the first cryptographic function corresponding to the first cryptographic function identifier using at least the first cryptographic function identifier;
applying, by the hardware processor, the first cryptographic function to the first encrypted key using the first cryptographic key to obtain a first intermediate cryptographic key;
determining, by the hardware processor, a content cryptographic key using the first intermediate cryptographic key; and
applying, by the hardware processor, the content cryptographic key to the encrypted content.

11. The method of claim 10, wherein the encrypted content comprises encrypted multimedia data.

12. The method of claim 10, wherein the first cryptographic function identifier is a salt value.

13. The method of claim 10, wherein the first cryptographic function identifier is a random seed.

14. The method of claim 10, wherein the first cryptographic function is selected from the group consisting of: a block cipher, AES, Blowfish, C2 block cipher, Camellia, CAST-128, CAST-256, CLEFIA, Cryptomeria, DES, FEAL, GOST 28147-89, ICE, IDEA, KASUMI, LOKI97, Lucifer, MacGuffin, MAGENTA, MARS, MISTY1, RC2, RC5, RC6, Skipjack, SMS4, TEA, Triple DES, Twofish, and XTEA.

15. The method of claim 10, wherein the first key identifier and the identifiers of the plurality of encrypted keys are column and row pairs.

16. The method of claim 10, wherein the first key identifier and the identifiers of the plurality of encrypted keys are n-vectors.

17. The method of claim 10, wherein the key bundle comprises a second cryptographic key, an associated second key identifier, and an associated second cryptographic function identifier and wherein determining a content cryptographic key using the first intermediate cryptographic key comprises:
selecting a second encrypted key from the plurality of encrypted keys such that the identifier of the second encrypted key is equivalent to the second key identifier;
determining a second cryptographic function corresponding to the second cryptographic function identifier;
applying the second cryptographic function to the second encrypted key using the second cryptographic key to obtain a second intermediate cryptographic key; and
determining the content cryptographic key using the second intermediate cryptographic key.

18. The method of claim 10, wherein determining a content cryptographic key using the first intermediate cryptographic key comprises:
applying a third cryptographic function to the first intermediate cryptographic key.

19. A computer program product for broadcast encryption, the computer program product comprising a non-transitory computer readable storage medium having program code embodied therewith, the program code executable by a processor to:
read a key bundle comprising a first cryptographic key, an associated first key identifier, and an associated first cryptographic function identifier, the first cryptographic function identifier identifying a first cryptographic function and providing information sufficient to derive the first cryptographic function;
read encrypted content;
read a plurality of encrypted keys, each encrypted key having an identifier;
select a first encrypted key from the plurality of encrypted keys such that the identifier of the first encrypted key is equivalent to the first key identifier;
determine the first cryptographic function corresponding to the first cryptographic function identifier using at least the first cryptographic function identifier;
apply the first cryptographic function to the first encrypted key using the first cryptographic key to obtain a first intermediate cryptographic key;
determine a content cryptographic key using the first intermediate cryptographic key;
apply the content cryptographic key to the encrypted content to obtain decrypted content.

20. The computer program product of claim 19, wherein the key bundle is encoded in a computer readable storage medium.

* * * * *